United States Patent [19]
Seiz et al.

[11] Patent Number: 5,083,650
[45] Date of Patent: Jan. 28, 1992

[54] FRICTION MATERIAL HAVING HEAT-RESISTANT PAPER SUPPORT BEARING RESIN-BONDED CARBON PARTICLES

[75] Inventors: David S. Seiz, St. Paul, Minn.; Larry Eldridge, Dayton, Ohio

[73] Assignees: Minnesota Mining and Manufacturing Company, St. Paul, Minn.; General Motors Corporation, Detroit, Mich.

[21] Appl. No.: 705,182

[22] Filed: May 24, 1991

[51] Int. Cl.⁵ .................. F16D 69/02; B32B 5/16
[52] U.S. Cl. ................... 192/107 M; 188/251 A; 427/203; 428/283; 523/156
[58] Field of Search ............ 192/107 M; 188/251 A; 427/203, 326; 428/283; 523/155, 156

[56] References Cited

U.S. PATENT DOCUMENTS

| | | |
|---|---|---|
| 3,652,510 | 3/1972 | Blomberg . |
| 3,673,143 | 6/1972 | Blair et al. . |
| 3,699,085 | 10/1972 | Johnson . |
| 3,723,169 | 3/1973 | Guastella et al. ............ 427/326 X |
| 3,817,941 | 6/1974 | Bair et al. . |
| 3,927,241 | 12/1975 | Augustin ............... 192/107 M X |
| 4,256,801 | 3/1981 | Chuluda ............... 192/107 M X |
| 4,320,823 | 3/1982 | Covaleski ............... 192/107 M |
| 4,374,211 | 2/1983 | Gallagher et al. .............. 523/156 |
| 4,504,523 | 3/1985 | Miller et al. ................. 427/203 X |
| 4,572,861 | 2/1986 | Garcia et al. ................ 428/283 X |
| 4,587,291 | 5/1986 | Gardziella et al. ............. 524/595 |
| 4,639,392 | 1/1987 | Nels et al. ................... 428/283 |
| 4,662,972 | 5/1987 | Thompson ................ 427/203 X |

FOREIGN PATENT DOCUMENTS 1525334 9/1971 Fed. Rep. of Germany .
1451864 10/1976 United Kingdom .

Primary Examiner—Rodney H. Bonick
Attorney, Agent, or Firm—Gary L. Griswold; Walter N. Kirn; Richard Francis

[57] ABSTRACT

A friction member which is suitable for use as a friction facing member in a transmission is provided. the friction member includes a uniform density heat resistant paper, a first layer of thermoset polymeric binder coated over and at least partially impregnated into one major surface of the paper, granular carbon friction particles uniformly distributed over and partially imbedded in the exposed surface of the first layer and a second layer of thermoset binder over the first layer and partially imbedded granular friction particles which coats without obscuring the granular friction particles. The friction member is made by applying a coating if liquid thermosettable binder filled with carbon particles to one major surface of the paper, supporting the coated paper and a movable carrier, applying a uniform layer of carbon friction particles over the binder layer, at least partially curing the binder layer, applying a second coating of thermosettable binder material over the carbon particles and curing the coatings until the binder material is thermoset.

12 Claims, 2 Drawing Sheets

FRICTION MATERIAL HAVING HEAT-RESISTANT PAPER SUPPORT BEARING RESIN-BONDED CARBON PARTICLES

BACKGROUND OF THE INVENTION

1. Field of the Invention

This invention relates to a friction material that is suited for use in a manual or automatic transmission drive assembly. Particularly, the invention relates to a friction material comprised of a heat resistant paper support which has a friction coating formed of plural layers of carbon particle-filled thermoset resin which includes granular carbon friction particles. The invention also relates to a method of making the friction material by coating the paper with a liquid dispersion of thermosettable binder material and carbon particle filler, introducing granular carbon friction particles and curing. The invention also provides a transmission which includes the friction material.

2. Background

Transmissions are utilized to engage and disengage a drive means between a motor or engine and its driven parts. Both manual and automatic transmissions are well known. Such devices typically utilize a member which bears a friction material to effectively engage these parts to efficiently operate under conditions which permit optimum performance with a long useful life. Manual transmissions typically utilize a blocker ring which bears a friction facing on its curved surface as an engaging means. The frictional properties of the friction material for automatic transmissions should be selected to provide relatively constant frictional engagement over a wide range of slip speeds to minimize transmission shudder. Heretofore a wide variety of friction materials have been utilized in transmissions. Early friction materials have included asbestos because of its good high temperature stability but asbestos is no longer thought to be an acceptable material because of environmental and health concerns. Various friction materials have included paper substrates impregnated with a thermoset binder but such materials typically do not have good wear and/or heat resistance to the engagement loads and energies normally encountered in medium and heavy duty transmission applications and they generally cannot maintain a desirable coefficient of friction for certain automatic transmission applications. Other friction materials have included granular or fibrous carbon or other similar materials bonded together by a thermoset binder. Such materials have a high internal strength and high energy absorbing capacity, but they have poor conformability due to their rigidity and require costly additional processing when being installed.

Particularly useful friction materials must have a wide variety of acceptable properties. The friction material must be compliant but resistant to compression, fatigue, abrasion and heat resistant, have desirable and sustainable frictional properties, and a long life. If any one of these properties is not satisfied, the friction material may fail. All of these properties must be present in a friction material which is utilized in a manual transmission blocker ring. For example, the friction material must be compliant to be conformable to a blocker ring surface of a manual transmission. If conformability, is not present, the friction material can prevent reliable manufacture and/or result in a weakened structure, thereby prematurely rendering inoperative the manual transmission. Various suggestions have been made for improved friction materials, but these have been without complete success. These include:

U.S. Pat. No. 4,320,823 (Covaleski et al.) teaches an improved friction member comprising a continuous bundle or tape of aramid fiber impregnated with and bonded together by a heat curable cement comprising water soluble phenolic resin and a heat curable elastomer. The friction member may also contain friction modifiers such as carbon black, graphite, metal oxides, metal powders, barytes, clay, silica, alumina, cryolite, litharge and the like.

U.S. Pat. No. 4,374,211 (Gallagher et al.) teaches a non-asbestos material containing a thermosetting binder, a non-asbestos fibrous reinforcing material such as carbon, metal (e.g., steel) or inorganic (e.g., ceramic) fibers and up to 15% by weight based on the total weight of other ingredients of an aramid polymer pulp fiber.

U.S. Pat. No. 4,639,392 (Nels et al.) discloses a clutch plate member consisting of a friction facing layer bonded to a rigid metal plate by a layer of adhesive. The friction facing layer consists of a compliant carrier sheet such as a friction paper composed of cellulose fibers saturated with liquid phenolic resin coated by compression molding of a granular mixture of carbon and phenolic thermoset binder.

United Kingdom Patent No. 1,451,864, published Oct. 6, 1976, discloses a friction element composed of a porous industrial carbon material which may be secured to a support such as a metal plate.

West German Patent No. 1,525,334, published Sept. 30, 1971, discloses a friction material comprising carbon in an elemental form, wherein the carbon content is less than 50% by weight.

As far as is known, there is no disclosure of a friction material for use in transmissions which includes carbon particles which are bonded by plural binder layers or a support formed substantially of aramid paper.

While aramid filaments in a bundle or tape have been suggested as an integral reinforcing component of a friction material, there is no disclosure or suggestion that an aramid paper could successfully be used as a support for a friction material. On the contrary, the only reference which suggests using aramid polymer fiber limits the amount of such fiber to 15% by weight of the total weight of other ingredients. It is not surprising that papers formed entirely of aramid pulp fiber have not been used even though they are known, since such aramid papers have a very poor green strength which causes them to disintegrate when subjected to liquid coating compositions.

SUMMARY OF THE INVENTION

The present invention provides a tough, strong, heat resistant friction member which can be used in an existing or future situation where such members are utilized, which has excellent frictional properties and a long life. The friction member is sufficiently compliant and conformable so that it may be used on a manual transmission blocker ring and it also finds utility as the friction element of an automatic transmission.

More particularly, the friction member of the present invention comprises:

(a) a uniform density heat resistant paper preferably formed substantially of aramid staple fiber;

(b) a first layer of filler thermoset polymeric binder preferably filled with carbon particles coated over and at least partially impregnated into one major surface of the paper;

(c) granular carbon friction particles uniformly distributed over and partially embedded in the exposed surface of the first layer; and (d) a second layer polymeric binder as defined in (b) over both the first layer and the partially embedded granular carbon friction particles such that it coats without obscuring the granular carbon friction particles.

The invention also provides a novel way of continuously making the friction material. The method comprises the steps of:

(a) applying a coating of a liquid coating composition of carbon filler particles and thermosettable binder material to one major surface of a continuous length of uniform density, heat resistant paper under viscosity conditions which cause the coating composition to surface coat and impregnate the paper;

(b) supporting the coated paper on a movable carrier;

(c) applying a uniform layer of granular carbon friction particles over the coating of step (a) while the coating is sufficiently uncured so that at least some of the granular carbon friction particles become partially embedded into the coating;

(d) at least partially curing the coating after application of the granular carbon friction particles;

(e) applying a coating of a coating composition as defined in (a) over the partially cured coating; and (f) curing the coatings until the binder material is thermoset.

The invention also provides a transmission which is conventional but for the inclusion of the friction material of the present invention. The transmission of the invention has unexpectedly uniform torque during engagement as slip speed changes because of the inclusion therein of the friction material of the invention.

As used herein,

"Uniform density, heat resistant paper" refers to any paper which will withstand the use conditions herein described for the friction material of the present invention.

"Uniform density, heat resistant paper formed of aramid stable fiber" refers to paper having a weight on the order of 28 to 100 g/m² formed by conventional paper making techniques substantially of aramid staple fibers wherein each fiber is of a length between about 0.5 and 2 cm.

"Carbon filler particles" refer to elemental carbon particles at least 90% by weight of which have an average particle size less than 50 μm, preferably less than 20 μm.

"Granular carbon friction particles" refer to elemental carbon particles at least 85% by weight of which have an average particle size which exceeds about 40 μm, preferably exceeding 80 μm, and no more than 10% by weight have an average particle size which exceeds about 250 μm, unless the friction material is for use in a manual transmission, in which case no more than 10% by weight will exceed 350 μm.

"Thermoset binder" refers to any infusible product of a precursor material which is liquid or liquefiable and upon heating to a curing temperature converts to the infusible product.

"Thermosetting or thermosettable material" refers to a precursor of a thermoset binder.

BRIEF DESCRIPTION OF THE DRAWINGS

A more complete appreciation of the invention will be obtained by reference to the following detailed description when considered in connection with the accompanying drawing; where.

DETAILED DESCRIPTION OF PREFERRED EMBODIMENTS

Figure 3:
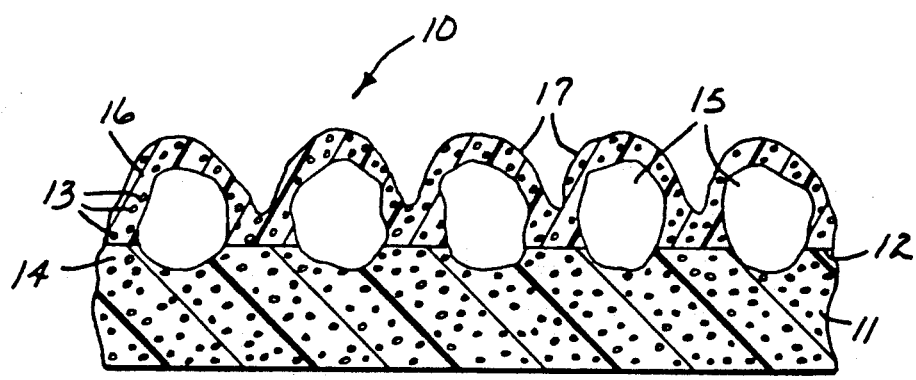
FIG. 3 is a cross-sectional view of a friction material embodying the present invention.

Referring initially to FIG. 3, a cross-sectional view of a friction material 10 embodying the present invention is shown. Heat resistant paper 11 is coated over one major surface 12 with carbon particle 13 filled thermoset resin coating 14 to which are adhered granular carbon friction particles 15 and over which is coated a carbon particle 13 filled thermoset layer 16 to provide roughened surface 17. The thermoset resin impregnates paper 11. Layer 16 coats granular carbon friction particles 15 without obscuring the individual particles which leaves friction material 10 with roughened surface 17.

The paper support used in the friction material of the present invention is preferably substantially formed of aramid polymer staple fibers to provide a uniform density paper. It has been found that great care must be taken in order to obtain a uniform density aramid staple fiber paper in order to provide a suitable friction material. The aramid staple fibers for this purpose should have a length between about 0.5 and 2 cm. At lengths longer than 2 cm, the fibers tend to form in papers which have dense areas which make them unacceptable. Shorter fibers than 0.5 cm do not easily form into papers with adequate handling strength. The papers also preferably have a weight on the order of 28 to 100 g/m² (most preferably 40 to 60 g/m²) to provide sufficient structure for the friction material. Useful aramid papers have been found to have an uncompressed caliper of about 0.3 to 0.5 mm, a tensile strength of 38 to 58 kPa, and an air permeability of about 2.5 to 4.5 m³/sec/m².

Aramid polymers suitable for use in practice of the invention are commercially available from E. I,. DuPont de Nemours Company, Wilmington, Del. under the trade names "KEVLAR", "KEVLAR" 29, "KEVLAR" 49, and "NOMEX". The term "aramid polymer" is used in the present specification means a synthetic polymeric resin generally designated in the art as an aromatic polycarbonamide. Such "aramid polymers" are disclosed in U.S. Pat. Nos. 3,652,510, 3,699,085, and 3,673,143 and thought to be of a polymer of high molecular weight, e.g. having an inherent viscosity of at least about 0.7, characterized by recurring units of the formula

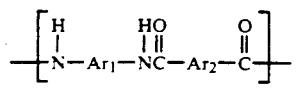

wherein $Ar_1$ is p-phenylene and/or chloro-substituted p-phenylene and/or 4,4-substituted diphenyl methane, i.e.,

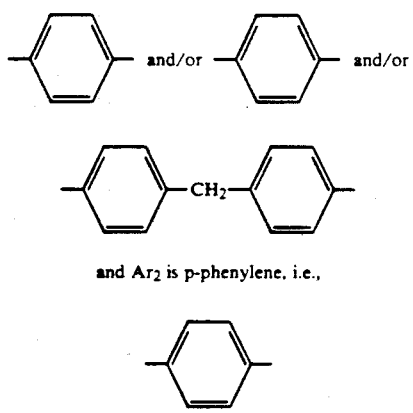

and $Ar_2$ is p-phenylene, i.e.,

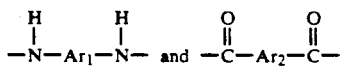

Illustrative examples of polycarbonamides having the definition of the above formula are poly (p-phenylene terephthalamide), chloro-substituted poly (p-phenylene terephalamide), and copolymers thereof.

The designation of the position of location of the substituent groups on the aromatic nuclei of the aramid polymer refers to the location of the substituents on the aromatic diamine, diacid or other coreactants from which the aramid polymer is prepared.

Although the aramid polymer or aromatic polycarbonamide may consist primarily of carbonamide links (—CONH—) and aromatic ring nuclei, conforming to the formula above, the polymer may contain up to 20 mole percent and preferably 0 to 5 mole percent of non-conforming comonomer units which provide units in the polycarbonamide chain different from $$-\overset{H}{\underset{|}{N}}-Ar_1-\overset{H}{\underset{|}{N}}- \text{ and } -\overset{O}{\underset{\|}{C}}-Ar_2-\overset{O}{\underset{\|}{C}}-$$

such as aromatic carbonamide units whose chain extending bonds are coaxial or parallel and oppositely directed, e.g.

$$-\overset{O}{\underset{\|}{C}}-\quad-\overset{N}{\underset{|}{N}}-\quad \text{ or } \quad-\overset{N}{\underset{|}{N}}-\quad-\overset{N}{\underset{|}{N}}-$$
$C_1$ meta-phenylene units, non-aromatic and non-amide groups.

A more comprehensive disclosure of the composition of aramid polymers is found in U.S. Pat. No. 3,673,143 as well as the divisional patent thereof, U.S. Pat. No. 3,817,941, the teachings of which are herein incorporated by reference.

Independent analytical tests and infra-red have indicated that "KEVLAR" 29 could be predominantly (95% weight) poly (p-phenylene diamine terephtalamide) and could be chemically described as poly (p-phenylene diamine terephthalamide)-co-poly (4,4-diamino diphenyl methane terephthalamide).

It is important that the aramid polymers utilized to obtain the unique advantages of the invention are in the staple form of aramid fibers. The length of the staple fiber, as previously mentioned, is from about 0.5 to 2 cm.

The papers, as previously stated, are made by conventional paper making techniques. They are also commercially available from International Paper of Tuxedo, N.Y. under the trade designation Kevlar ® Mat Series 8000050, 8000051, 8000052, 8000065, and 8000068, the later being most preferred for manual transmissions.

Although the paper is preferably formed substantially entirely of aramid polymer staple fibers, it should be understood that a portion of the fibers of the paper, preferably less than about 50% by weight, could be replaced by non-aramid fibers. Such replacement fibers may be formed of cotton, jute, hemp, rayon, but they are preferably of heat resistant materials such as ceramic, metal or glass.

Other suitable heat-resistant papers may be formed substantially entirely of glass fibers, carbon fibers, fibers formed of heat-resistant organic materials such as polyvinyl alcohol, or fibers made from ceramic materials, such fibers being sold by the present assignee under the trade designation "Nextel".

The fibers of the paper are held together with a limited amount of a resin binder material to prevent disintegration of the paper during handling. The amount of resin in this case is preferably just sufficient to hold the fibers together without otherwise altering the openness of the paper. Preferred binder materials for this purpose include acrylic lattices, styrene butadiene rubber, vulcanized rubber, nylon, polyurethane, phenolic resin, epoxy resin, acrylate resin, isocynate resin and combinations thereof. The most peferred binder is an acrylic latex.

The carbon filler particles are preferably petroleum coke-based carbon generally of irregular shape. The granular carbon friction particles are preferably of the same composition and shape. Such particles are commercially available from suppliers such as Asbury Graphite Mills, Inc. Such carbon particles consist primarily of elemental carbon. They can be coke, carbon black or graphite. Coke is an amorphous form of carbon and is made from the distillation of coal or petroleum residues in the absence of air. Carbon black is another amorphous form of carbon made from the thermal or oxidative decomposition of hydrocarbons. Graphite is a crystalline allotropic form of carbon. Graphite occurs naturally or it can be made synthetically by heating petroleum coke to approximately 3000° C. in an electric resistance furnace.

Coke, preferably petroleum coke, is the preferred carbon filler particle. The petroleum coke contains typically less than one percent of inorganic materials. For the granular carbon particles, metallurgical coke or a calcined petroleum coke particle are the preferred coke particles.

The thermoset binder material which is useful in the present invention may be formed of any conventional precursor material which forms an infusible heat resistant product which withstands the use conditions described above. Examples of such thermoset materials include those derived from phenolic resins, epoxy resins, urethane resins, cashew nut shell resins, napthalinic phenolic resins, epoxy modified phenolic resins, silicone resins, polyimide resins, urea formaldehyde resins, methylene dianiline resins, methyl pyrrolidinone resins, acrylate resins, isocyanate resins and mixtures thereof. The preferred thermoset resin for use in the friction materials of the present invention is derived from phenolic resin due to its low cost, heat resistance and excellent physical properties. The most preferred phenolic resin is a fast gelling acid cure resole phenolic resin. Acid cure resole phenolic resins are disclosed in U.S. Pat. No. 4,587,291, the disclosure of which is incorporated herein by reference.

The acid curing phenol resin, i.e., the phenol resoles, which are preferred for the practice of the invention are alkaline condensed, reaction products of phenols and aldehydes, wherein both mono- or polynuclear phenols may be used. In further detail, mononuclear phenols, and both mono- and polyfunctional phenols, such as phenol itself, and also its alkyl substituted homologs, such as o-, m-, p-cresol or xylenols, are suitable. Also suitable are halogen-substituted phenols, such as chloro- or bromophenol and polyfunctional phenols, such as resorcinol or pyrocatechol. The term "polynuclear phenols" refers, on the one hand, for example, to naphthols, i.e., compounds with fused rings. On the other hand, however, one can also use polynuclear phenols for the purposes of the invention that are linked by aliphatic bridges or by hetero atoms, such as oxygen. Polyfunctional, polynuclear phenols also provide suitable thermosetting phenyl resoles.

The aldehyde component can be formaldehyde, acetaldehyde, propionaldehyde, or butyraldehyde, and also products that can release aldehyde under condensation conditions, such as, for example, formaldehyde bisulfite, urotropin, trihydroxymethylene, paraformaldehyde, or paraldehyde. The stoichiometric quantities of phenol and aldehyde components are in the ratio of 1:1.1 to 1:3.0. The resins are usually used in the form of aqueous solutions with a content of non-volatile substances of 60 to 85%.

The phenol resins used according to the invention preferably have a content of monomeric phenols of less than 5%. They can also be modified additionally with up to 30% of urea, melamine or furfuryl alcohol, according to known methods.

Effective as curative salts of organic sulfonic acids are the copper, aluminum, and iron(III) salts of aromatic sulfonic acids represented by the structural formula:

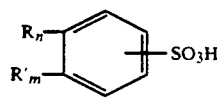

where R and R' can be identical or different and represent hydrogen, an alkyl, hydroxy, alkoxy, or carboxy group; a substituted or unsubstituted aryl or aralkyl group; or another optionally substituted sulfonyl group, and n and m can be identical or different and represent integral numbers from 0 to 5, but do not add to more than 5. The number of carbon atoms of the aromatic sulfonic acids is 6 to 14, with 6 carbon atoms for benzene sulfonic acid and 14 for anthracene sulfonic acid. Alkyl groups of the substituted aromatic sulfonic acids are methyl, ethyl, propyl, isopropyl, dimethyl and trimethyl. As substituted sulfonyl, an methylene sulfonyl group or generally a sulfonated alkylene chain is meant. Examples of sulfonic acids of this type are benzenesulfonic acids, benzenedisulfonic acids, alkylbenzenesulfonic acids, such a toluenesulfonic, toluenedisulfonic, xylenesulfonic, trimethylbenzensulfonic, isopropylbenzenesulfonic, or tetrahydronaphthalenesulfonic acid, sulfonobenzoic acid, sulfophthalic acid, hydroxysulfonic acids, such as hydroxybenzenesulfonic, dihydroxybenzenesulfonic, hydroxybentenedisulfonic or cresolsulfonic acid, methoxybentene sulfonic, carbonhydroxibentenesulfonic, diphenylmethanedisulfonic, diphenyl ether disulfonic, diphenyl sulfone disulfonic, naphthalenesulfonic, alkylnaphthalenesulfonic, naphthalenedisulfonic, anthracenesulfonic, or carbazolesulfonic acid. The preferred sulfonic acids are benzenesulfonic, phenolsulfonic, or p-toluenesulfonic acids. Salts of individual sulfonic acids or sulfonic acid mixtures and mixtures of salts of different metals can be used.

The addition products of aromatic sulfonic acids to polyols, which are also used as curing agents, are obtained by mixing the aqueous solutions of the acids with the polyols or their aqueous solutions and subsequently heating of the mixtures (5-10 minutes to 50°-100° C.). They are used as aqueous solutions.

The mole ratio of acid to polyol can be within the range of 3:1 to 1:3. The mole ratio of 2:1 is preferably used. All of the sulfonic acids mentioned above, individually or mixed with each other, can be used as aromatic sulfonic acids for the addition products according to the invention. Benzenesulfonic, phenolsulfonic, and/or p-toluenesulfonic acid are preferred.

Both water-soluble polyether and polyester polyols are suitable as polyols, insofar as they have an OH number in the range of 50-500. The polyols generally have a molecular weight in the range of 200 to 4000.

Examples of polyether polyols are the aliphatic series such as polyethylene glycols, polypropylene glycols, or reaction products of propylene oxide with different triol components, such as trimethylolpropane or glycerol or with penta- and hexafunctional alcohols.

Polyester polyols are condensation products of aliphatic and/or aromatic dicarboxylic acids such as, for example, the three isomeric phthalic acids of adipic, succinic, glutaric acid or the like with polyhydric alcohols such as, for example butanediol, hexanetriol, glycerol, or trimethylolpropane. The polyols modified by the addition of unsaturated fatty acids can also be used with good results.

The quantity of curing agents used is calculated such that the weight ratio of resin to curing agents or curing agent combination is in the range of 1:0.01 to 1:0.5. The mixtures thus produced have a processing time of over four hours at room temperature, i.e., during this time period the cure is so minimal that only a relatively small increase in viscosity is observed and processing can be carried out without disturbance of the polymer structure of the product cured later.

The curing is carried out in practice at a moderately elevated temperature, preferably within the range of 60°-150° C. In this case, the resin/curing agent mixture is tack-free within a few minutes and the cure takes place in such a way that it is complete after from one to about twelve hours.

The thermosetting binder of the first coating will penetrate the aramid paper and reinforce it by encasing the fibers. The second coating will also penetrate the paper, further reinforcing it and also adherently binding the granular friction particles within the friction member.

A solvent may be added to the thermosetting binder in order to lower the viscosity so that adequate penetration of the paper may be achieved. Typically, solvent will be added to the binder to provide a dispersion having on the order of 65 to 75% solids. A suitable solvent for the phenolic resin is a 50/50 blend of glycol ether with water or a 50/50 blend of ethylene glycol monobutyl ether with water. If larger amounts of water are used, this tends to cause the phenolic resin to precipitate out of the solution. However, in some instances water is preferred due to the pollution concerns associated with organic solvents.

Figure 1:
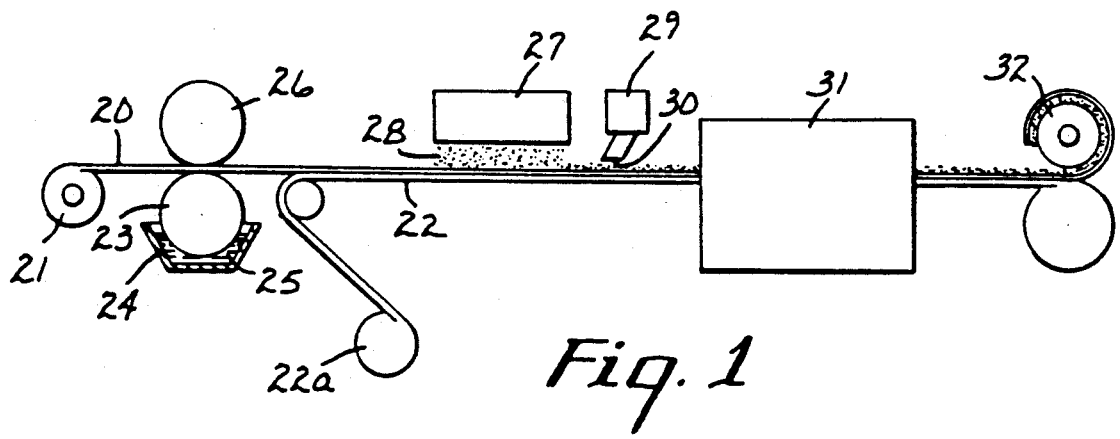
FIGS. 1-2 are schematic depictions which together show a preferred method of making the friction material of the present invention.
Figure 2:
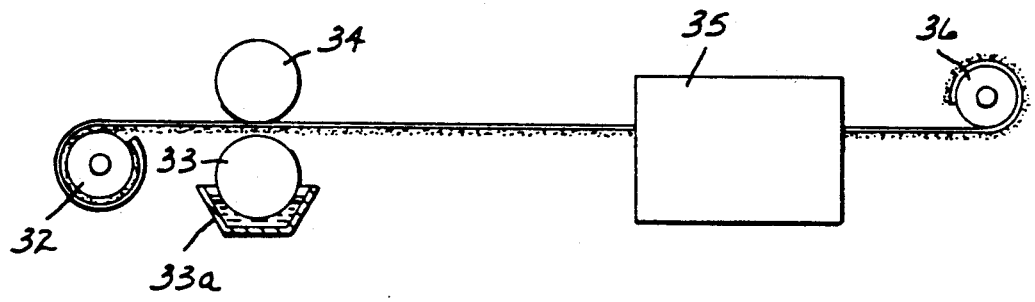

Referring to FIG. 1-2, there is a schematic shown of the two-step processing operation which may be utilized to obtain the friction material of the present invention. Heat resistant paper 20 drawn from a supply roll 21 is passed over coater roll 23 as it rotates in a bath 24 of liquid curable binder 25 and is urged against back-up roll 26. As heat resistant paper 20 passes between roll set 23 and 26 it becomes impregnated with liquid curable resin 25. The impregnated paper is then deposited onto the surface of a carrier sheet 22 (drawn from roll 22a) which may be any convenient sheet-like material which will withstand the processing conditions to be described and the combination is then passed beneath granular carbon friction particle deposition station 27 which uniformly deposits granular carbon particles 28 over the surface of the curable resin impregnated paper 20 to provide a uniform coating thereof which is then passed beneath air source 29 which has an outlet 30 which causes air to pass over the granular carbon particle coated surface of the paper to remove any nonadhered granular carbon particles. The sheet-like material may be replaced by a wire mesh conveyor. The resulting coated sheet is then passed through curing oven 31 which is heated at a temperature sufficient to at least partially cure the resin binder and then the resulting coated product is drawn out of the oven and wound upon storage roll 32. The coated product on storage roll 32 is then passed between coater roll 33 which is being rotated in a liquid curable resin bath 33a and urged against back-up roll 34 to apply a second coating of binder to the previously coated surface of the heat resistant paper. The resulting coated product is then passed through curing oven 35 preferably having zones of increasing heat to provide slow curing and solvent evaporation, as needed to prevent blistering and collected on storage roll 36. The completed rolls are later placed into a post-curing oven (not shown) to complete any additional curing required. Thereafter, the coated material from roll 36 is cut into smaller sizes depending upon the particular application, as a friction material for transmissions. Shapes may be annular disks or strips.

The coaters shown in FIGS. 1-2 are roll coaters but other conventional coating equipment may also be utilized such as spray coating, rotogravure coating, extrusion coating and the like. Additionally, the granular carbon friction particles are shown as being dropped onto the surface of the binder-coated web, but other particle coating operations may also be utilized. Examples of such particle coating techniques are well known, for example, in the preparation of coated abrasive products.

The resin is shown as being cured in a tunnel oven, but other energy sources may also be utilized. Such energy sources could include radiation sources such as infrared or UV radiation energy sources. Additionally, the coating operation shown in FIGS 1-2 is shown in a two-step sequence. It should be understood that the coating operation could be carried out in a single operation which would pass the finished product of FIG. 1 directly through the coater of FIG. 2 without the interim storage of the product of FIG. 1.

The coating weight of the initial resin coating is preferably on the order of 200 to 400 grams per square meter, preferably 230 to 400 grams per square meter, on a dry basis. The preferred weight of the granular carbon friction particles is on the order of 75 to 150 grams per square meter, preferably 85 to 120 grams per square meter. The final coating of resin is preferably on the order of 250 to 400 grams per square meter, most preferably 300 to 375 grams per square meter, on a dry basis.

Various modifications may be made in the process, ingredients and friction material of the invention without departing from the scope of the claimed invention. For example, it is desirable to dress the surface of the friction material when it is destined for use in an automatic transmission to minimize the leak rate of transmission fluid across the face of the friction sheet material. Dressing is also thought to provide better total caliper control and exposure of the granular coke particles, reduce wear and debris generation. Dressing is generally accomplished after final curing and before cutting (slitting) to size and shape. Dressing typically removes a thin segment of the exposed surface of the coke particles, typically on the order of 10 to 40 micrometers in thickness, although the optimum segment thickness has not yet been determined. Dressing is typically accomplished by grinding the surface of the friction sheet with a grinder such as a Curtain-Hebert wide face finishing machine model No. 450 which has two parallel rotatable rolls separated by an adjustable gap. Adhesive-backed coated abrasive bearing grade 220 alumina abrasive particles is adhered to the upper roll of the two roll set and the friction surface sheet passed through the gap with the abrasive in contact with the carbon particle coating. The surface speed of the abrasive covered roll is rotated at a rate faster than the rate at which the sheet being abraded is passed through the gap.

The invention is further illustrated by the following examples wherein all parts and percentages are by weight, unless otherwise indicated.

EXAMPLE 1

This example illustrates the preparation of a friction material in accordance with the present invention which is suitable for use in an automatic transmission.

The friction material was made by first coating an aramid paper with a coating composition, depositing granular carbon friction particles on one surface of the paper, precuring the coating composition, applying a second coating composition to the granular carbon friction particle coated surface of the paper, and finally curing both coatings. The first and second coating compositions were formed of the following ingredients:

| Parts (grams) | Ingredient |
| --- | --- |
| 720 | Water |
| 720 | Propylene glycol methyl ether solvent |
| 4,370 | A-staged base-catalyzed resol phenyl formaldehyde thermosetting resin having a phenyl to formaldehyde mole ratio of 1:2 and a viscosity of 70,000 cps (25° C., No. 4 spindle. 6 rpm) (70% solids) |
| 4,020 | Carbon filler particles having an average particle size of 5 to 6 $\mu$m and being obtained from Asbury Graphite Mills, Asbury, NJ as product No. 4023. |
| 150 | Solution of paratoluene sulfonic acid (70% in water) |
| 20 | Aluminum chloride aqueous solution (28% |

| Parts (grams) | Ingredient |
|---|---|
| | solids) |

The coating composition described above was made by charging into a container the water, propylene glycol methyl ethyl ether and resol phenyl formaldehyde resin solution. The contents were stirred to obtain a uniform mixture. The petroleum coke filler particles were slowly added with continued mixing until a uniform mixture was obtained. Following that, the paratoluene sulfonic acid and the aluminum chloride solutions were added with continued mixing. The aluminum chloride was added as a curing agent for the resol phenyl formaldehyde resin.

The aramid paper had a nominal weight of 50.9 g/m² and was formed of aramid staple fiber having an average length of 1.27 cm. The fibers were purchased from the E. I. DuPont De Nemours Company of Wilmington, Del. under the trademark Kevlar. The paper was obtained from the International Paper Company as its product number 8000068.

The paper was drawn off a supply roll between a 5.4 cm (10 inch) diameter rubber coating roll and a 25.4 cm (10 inch) diameter steel back-up roll at a rate on the order of 4.5 to 6.2 meters (15 to 20 feet) per minute while applying a roll-to-roll pressure of 21 kg per lineal centimeter (120 pounds per lineal inch) to saturate the paper. The saturated paper was then placed on the surface of a horizontally deployed polyethylene terephthalate film which was being carried at the same rate as the rate of paper movement and the film-borne saturated paper was passed beneath a cascade of granular carbon particles which were sprinkled over the saturated paper to obtain a uniform coating of adhered particles and the nonadhered particles were dispatched from the coated surface by a gentle air stream. The granular carbon particles had an average particle size on the order of 130 μm and were obtained from Asbury Graphite Mills, Asbury, N.J. under its product code 4546. The granular carbon particles consisted of hard petroleum coke particles which had passed through a 100 mesh U.S. standard screen while being retained on a 150 mesh U.S. standard screen. The dry coating weight of the coating composition was on the order of 300 g/m² and the coating weight of granular carbon particles was on the order of 97 g/m².

The resulting coated sheet material was passed through a oven heated at 100° C. for a residence time of 15 minutes and for 15 minutes at 105° C. to partially cure the resin. The coated paper was then separated from the carrier film and wound onto a storage roll. The storage roll was coated in a coating operation substantially the same as the first coating operation except with the particle coated surface facing the rubber coating roll to apply a roll of the same coating composition over the particle covered surface of the paper. The coating conditions for the second coating operation were the same as for the first and the dry add-on coating weight of the second coating was 270 g/m². After the second coating operation, the resulting product was passed into a 100° C. oven for a residence time of 15 minutes, 15 minutes at 150° C. and then into a 105° C. oven for a residence time of 10 hours to fully cure both coatings.

EXAMPLE 2

This example illustrates the preparation of a friction material suited for a manual transmission. The friction material for this example was made in the same manner as that described in Example 1, except that different granular carbon particles were employed. These were obtained from the same source, Asbury Graphite Mills, as its product code No. 4547. These were metallurgical coke particles which passed through a 60 mesh screen while being retained on a 100 mesh screen.

TESTING

Figure 4:
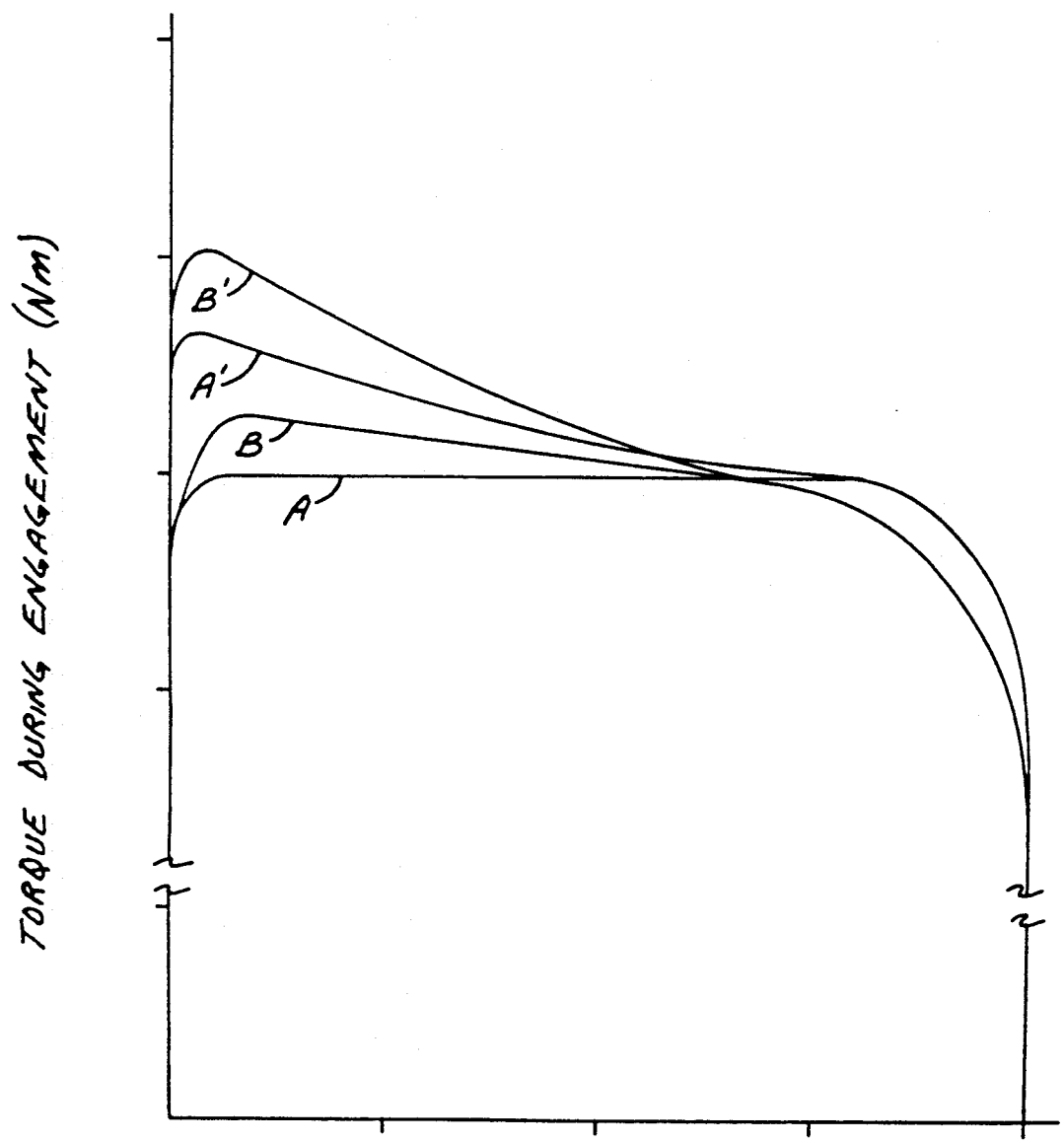
FIG. 4 is a graph illustrating and comparing the new and used oil frictional performance of the friction material of the present invention with a prior art paper-based friction material in an automatic transmission application.

FIG. 4 is a graph which compares the performance (torque during clutch engagement in Nm vs. slip speed in RPM) in an automatic transmission torque converter lockup clutch of the friction material of Example 1 of the present invention in fresh transmission fluid(a) and used transmission fluid (A') with a state-of-the-art paper-based friction material in fresh transmission fluid (B) and used transmission fluid (B'). Fresh transmission fluid is automatic transmission fluid which contains conventional polar additives to improve uniformity and smoothness of clutch engagement. The state-of-the-art paper-based friction material was based on filled cellulose paper impregnated with a thermoset resin and is the friction material which is present in automatic transmissions currently being sold by the General Motors Corporation as Hydramatic ™ Nos. 44T4 and 700R4. Such automatic transmission fluids are commercially available, for example, under the trade designation Dexran II ATF. Used transmission fluid is produced by subjecting fresh transmission fluid to severe use conditions which cause the polar additives to decompose or degrade to such a degree that they no longer act in cooperation with the friction material to provide uniformity and smoothness of clutch engagement. The test was performed in a device which simulates an automatic transmission.

The flatness of the A curve reveals that the friction material of the present invention provides substantially uniform torque during engagement over a wide span of slip speed. By contrast, the conventional paper-based friction material has a much steeper slope, curve B, indicating a variation in torque during engagement as slip speed changes.

This effect is even more pronounced in used transmission fluid, comparing curve A' (obtained with the friction material of Example 1 of the invention) with curve B' (obtained with the friction material of the prior art as described above), clearly establishing the advantage of the friction material of the invention over that of the noted prior art.

We claim:
1. A friction member which is especially useful as a friction facing member in a transmission, said friction member comprising:
 (a) a uniform density heat resistant paper;
 (b) a first layer of thermoset polymeric binder coated over and at least partially impregnated into one major surface of the paper;
 (c) granular carbon friction particles uniformly distributed over and partially embedded in the exposed surface of the first layer; and
 (d) a second layer polymeric binder as defined in (b) over the first layer and the partially embedded granular carbon friction particles which coats without obscuring the granular carbon friction particles.

2. The friction member of claim 1 wherein said paper has a weight 40 to 60 g/m².

3. The friction member of claim 1 wherein said heat resistant paper is formed substantially of resin bonded aramid staple fibers.

4. The friction member of claim 3 wherein said aramid staple fibers have a length between 0.6 and 2 cm.

5. The friction member of claim 3 wherein said resin is an acrylate resin.

6. The friction member of claim 1 wherein said thermoset polymer is an acid-catalyzed phenolic resin.

7. The friction member of claim 1 wherein said first layer of thermoset polymeric binder is filled with carbon filler particles.

8. The friction member of claim 7 wherein said carbon filler particles are of a size less than 50 μm.

9. The friction member of claim 1 wherein at least 85% by weight of said carbon friction particles have an average particle size which exceeds about 40 μm and no more than about 10% by weight have an average particle size which exceeds 250 μm.

10. The friction member of claim 1 wherein at least 85% by weight of said carbon friction particles have an average particle size which exceeds about 40 μm and no more than about 10% by weight have an average particle size which exceeds 350 μm.

11. Method of making a friction member, said method comprising the steps of:
  (a) applying a coating of a liquid coating composition comprising thermosettable binder material filled with carbon filler particles to one major surface of a continuous length of uniform density, heat resistant paper under viscosity conditions which cause the coating composition to coat and impregnate the coated surface of the paper;
  (b) supporting the coated paper on a movable carrier;
  (c) applying a uniform layer of granular carbon friction particles over the coating of step (a) while the coating is sufficiently uncured so that at least some of the granular carbon friction particles become partially embedded into the coating;
  (d) at least partially curing the coating after application of the granular carbon friction particles;
  (e) applying a coating of a coating composition as defined in (a) over the partially cured coating; and
  (f) curing the coatings until the binder material is thermoset.

12. A transmission which includes a friction facing member to transmit torque to another member by contact therewith, said friction facing member comprising:
  (a) a uniform density heat resistant paper;
  (b) a first layer of thermoset polymeric binder coated over and at least partially impregnated into one major surface of the paper;
  (c) granular carbon friction particles uniformly distributed over and partially embedded in the exposed surface of the first layer; and
  (d) a second layer polymeric binder as defined in (b) over the first layer and the partially embedded granular carbon friction particles which coats without obscuring the granular carbon friction particles.

* * * * *

UNITED STATES PATENT AND TRADEMARK OFFICE
CERTIFICATE OF CORRECTION

PATENT NO. : 5,083,650

DATED : January 28, 1992

INVENTOR(S) : Seitz, et al

It is certified that error appears in the above-identified patent and that said Letters Patent is hereby corrected as shown below:

ON THE TITLE PAGE

Item [19], "Seiz et al" should read --Seitz et al--;

[75], David S. Seiz" should read --David S. Seitz--.

| | |
|---|---|
| Abstract, line 12, | "if" should read --of--. |
| Col. 1, line 64, | "conformability," should read --conformability--. |
| Col. 2, line 67, | "layer of filler thermoset" should read --layer of thermoset--. |
| Col. 3, lines 15-16, | "carbon filler particles and thermosettable binder material" should read --thermosettable binder material preferably including carbon filler particles--. |

UNITED STATES PATENT AND TRADEMARK OFFICE
CERTIFICATE OF CORRECTION

PATENT NO. : 5,083,650

DATED : January 28, 1992

INVENTOR(S) : SEITZ, ET AL.

It is certified that error appears in the above-identified patent and that said Letters Patent is hereby corrected as shown below:

Col. 5, lines 47-52, 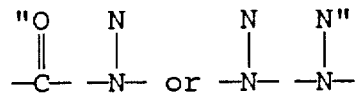

should read

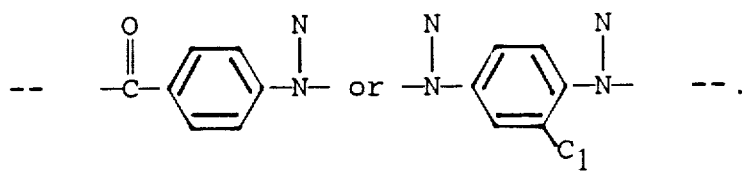

Col. 6, line 31, "isocynate" should read --isocyanate--.

Col. 11, line 25, "5.4" should read --25.4--.

Signed and Sealed this

Tenth Day of August, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,083,650
DATED : January 28, 1992
INVENTOR(S) : SEITZ, ET AL

It is certified that error appears in the above-indentified patent and that said Letters Patent is hereby corrected as shown below:

Column 13, lines 32-33, "material filled with carbon filler particles" should read --material--.

Signed and Sealed this

First Day of March, 1994

Attest:

BRUCE LEHMAN

Attesting Officer     Commissioner of Patents and Trademarks